United States Patent
Noureldin et al.

(10) Patent No.: US 10,443,453 B2
(45) Date of Patent: Oct. 15, 2019

(54) NATURAL GAS LIQUID FRACTIONATION PLANT COOLING CAPACITY AND POTABLE WATER GENERATION USING INTEGRATED VAPOR COMPRESSION-EJECTOR CYCLE AND MODIFIED MULTI-EFFECT DISTILLATION SYSTEM

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Araabian Oil Company, Dhahran (SA)

( * ) Notice: Subject to any disclaimer, the term of this patent is extended or adjusted under 35 U.S.C. 154(b) by 0 days.

(21) Appl. No.: 15/842,160

(22) Filed: Dec. 14, 2017

(65) Prior Publication Data
US 2019/0048753 A1 Feb. 14, 2019

Related U.S. Application Data

(60) Provisional application No. 62/542,687, filed on Aug. 8, 2017.

(51) Int. Cl.
*F01K 27/02* (2006.01)
*C02F 1/16* (2006.01)
(Continued)

(52) U.S. Cl.
CPC ............ *F01K 27/02* (2013.01); *B01D 1/0058* (2013.01); *B01D 1/0082* (2013.01); *B01D 1/26* (2013.01);
(Continued)

(58) Field of Classification Search
CPC ........ F01K 27/02; F28D 21/0001; C02F 1/16; F25B 27/02; B01D 53/002; B01D 53/263; B01D 53/1456
See application file for complete search history.

(56) References Cited

U.S. PATENT DOCUMENTS 4,907,410 A 3/1990 Chang
2,685,152 A 11/1997 Sterling
(Continued)

FOREIGN PATENT DOCUMENTS

| WO | 2006039182 | 4/2006 |
|---|---|---|
| WO | 2012003525 | 1/2012 |
| WO | 2017035166 | 3/2017 |

OTHER PUBLICATIONS

M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.
(Continued)

*Primary Examiner* — Brian A McCaig
(74) *Attorney, Agent, or Firm* — Fish & Richardson P.C.

(57) ABSTRACT

Certain aspects of natural gas liquid fractionation plant cooling capacity and potable water generation using integrated vapor compression-ejector cycle and modified multi-effect distillation system can be implemented as a system. The system includes a waste heat recovery heat exchanger network thermally coupled to multiple heat sources of a Natural Gas Liquid (NGL) fractionation plant. The heat exchanger network is configured to recover at least a portion of heat generated at the multiple heat sources. The system includes a first sub-system thermally coupled to the waste heat recovery heat exchanger to receive at least a first portion of heat recovered by the heat exchanger network.
(Continued)

The first sub-system is configured to perform one or more operations using at least the first portion of heat recovered by the heat exchanger network.

24 Claims, 16 Drawing Sheets

(51) Int. Cl.
| | |
|---|---|
| F25B 27/02 | (2006.01) |
| F28D 21/00 | (2006.01) |
| B01D 1/00 | (2006.01) |
| B01D 1/26 | (2006.01) |
| B01D 3/06 | (2006.01) |
| B01D 3/14 | (2006.01) |
| C10G 5/06 | (2006.01) |
| C10G 7/00 | (2006.01) |
| F01K 25/10 | (2006.01) |
| F25J 3/02 | (2006.01) |
| B01D 53/00 | (2006.01) |
| B01D 53/14 | (2006.01) |
| B01D 53/26 | (2006.01) |
| C02F 103/08 | (2006.01) |

(52) U.S. Cl.
CPC ............ *B01D 3/065* (2013.01); *B01D 3/146* (2013.01); *C02F 1/16* (2013.01); *C10G 5/06* (2013.01); *C10G 7/00* (2013.01); *F01K 25/10* (2013.01); *F25B 27/02* (2013.01); *F25J 3/0209* (2013.01); *F25J 3/0233* (2013.01); *F25J 3/0238* (2013.01); *F25J 3/0242* (2013.01); *F28D 21/0001* (2013.01); *B01D 53/002* (2013.01); *B01D 53/1456* (2013.01); *B01D 53/263* (2013.01); *C02F 2103/08* (2013.01); *F25J 2240/60* (2013.01); *F25J 2260/02* (2013.01); *F25J 2270/12* (2013.01); *F25J 2270/60* (2013.01); *F25J 2270/902* (2013.01); *F28D 2021/0019* (2013.01)

(56) References Cited

U.S. PATENT DOCUMENTS

| | | |
|---|---|---|
| 7,257,966 B2 | 8/2007 | Lee et al. |
| 2006/0065015 A1 | 3/2006 | Mccoy |
| 2017/0058711 A1 | 3/2017 | Noureldin et al. |

OTHER PUBLICATIONS

Rahimi et al., "A novel process for low grade heat driven desalination," Desalination, Oct. 15, 2014, vol. 351, pp. 202-212.
International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018 20 pages.
International Search Report and Written Opinion issued in International Application No. PCT/US2018/045640 dated Nov. 22, 2018 19 pages.
International Search Report and Written Opinion issued in International Application No. PCT/US2018/045535 dated Nov. 22, 2018 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.
Lira-Barragan et al., "Sustainable Integration of Trigeneration Systems with Head Exchanger Networks," Industrial & Engineering Chemistry Research, vol. 53, No. 7, Feb. 4, 2014, 19 pages.
Ammar et al., "Low grade thermal energy sources and uses from the process industry in the UK," Applied Energy, Elsevier Science Publishers, vol. 89, No. 1, Jun. 1, 2011, 18 pages.
Gaberiel et al., "Optimization across the water—energy nexus for integrating heat, power, and water for industrial processes, couples with the hybrid thermal-membrane dealination," Industrial and Engineering Chemistry Research, vol. 55, No. 12, Feb. 16, 2016, 25 pages.
Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.
Ophir et al., "Advanced MED process for most economical sea water desalination," Desalination, Elsevier, Amsterdam, NL, vol. 182, No. 1-3, Nov. 1, 2005, 12 pages.
Gnaneswar Gude et al., "Feasibility study of a new two-stage low temperature desalination process," Energy Conversation and Management, Elsevier Science Publishers, vol. 56, Nov. 30, 2011, 7 pages.

NATURAL GAS LIQUID FRACTIONATION PLANT COOLING CAPACITY AND POTABLE WATER GENERATION USING INTEGRATED VAPOR COMPRESSION-EJECTOR CYCLE AND MODIFIED MULTI-EFFECT DISTILLATION SYSTEM

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants", which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | h |
| Pounds per square inch (pressure) | psi |
| Kilogram (mass) | Kg |
| Second | S |

TABLE 1-continued

| Unit of Measure | Abbreviation |
| --- | --- |
| Cubic meters per day | m$^3$/day |
| Fahrenheit | F. |

Certain aspects of the subject matter described here can be implemented as a system. In an example implementation, the system includes a waste heat recovery heat exchanger network thermally coupled to multiple heat sources of a Natural Gas Liquid (NGL) fractionation plant. The heat exchanger network is configured to recover at least a portion of heat generated at the multiple heat sources. The system includes a first sub-system thermally coupled to the waste heat recovery heat exchanger to receive at least a first portion of heat recovered by the heat exchanger network. The first sub-system is configured to perform one or more operations using at least the first portion of heat recovered by the heat exchanger network.

In an aspect combinable with the example implementation, the system includes a second sub-system thermally coupled to the waste heat recovery heat exchanger to receive at least a second portion of heat recovered by the heat exchanger network. The second sub-system is separate and distinct from the first sub-system, and is configured to perform one or more operations using at least the second portion of heat recovered by the heat exchanger network.

In another aspect combinable with any of the previous aspects, the system includes a control system connected to the heat exchanger network and the first sub-system, or the heat exchanger network and the second sub-system, or the heat exchanger network, the first sub-system and the second sub-system. The control system is configured to flow fluids between the NGL fractionation plant, the heat exchanger network one or both of the first sub-system or the second sub-system.

In another aspect combinable with any of the previous aspects, the fluids include one or more of a NGL fractionation plant stream or a buffer fluid.

In another aspect combinable with any of the previous aspects, the multiple heat sources include first multiple sub-units of the NGL fractionation plant including a propane dehydration section, a de-propanizer section, a butane de-hydrator section, and a de-butanizer section, a second multiple sub-units of the NGL fractionation plant including a de-pentanizer section, an Amine-Di-Iso-Propanol (ADIP) regeneration section, a natural gas de-colorizing section, a propane vapor recovery section and a propane product refrigeration section, and third multiple sub-units of the NGL fractionation a propane product sub-cooling section, a butane product refrigeration section, an ethane production section and a Reid Vapor Pressure (RVP) control section.

In another aspect combinable with any of the previous aspects, the heat exchanger network includes multiple heat exchangers.

In another aspect combinable with any of the previous aspects, the multiple heat exchangers include a first subset comprising one or more of the multiple heat exchangers thermally coupled to the first plurality of sub-units of the NGL fractionation plant.

In another aspect combinable with any of the previous aspects, the first subset includes a first heat exchanger thermally coupled to the propane dehydration section, and configured to heat a first buffer stream using heat carried by a propane de-hydration outlet stream from the propane de-hydration section. The first subset includes a second heat exchanger thermally coupled to the de-propanizer section, and configured to heat a second buffer stream using heat carried by a de-propanizer overhead outlet stream from the de-propanizer section. The first subset includes a third heat exchanger thermally coupled to the butane de-hydrator section, and configured to heat a third buffer stream using heat carried by a butane de-hydrator outlet stream. The first subset includes a fourth heat exchanger thermally coupled to the de-butanizer section, and configured to heat a fourth buffer stream using heat carried by a de-butanizer overhead outlet stream from the de-butanizer section. The first subset includes a fifth heat exchanger thermally coupled to the de-butanizer section, and configured to heat a fifth buffer stream using heat carried by a de-butanizer bottoms outlet stream from the de-butanizer section.

In another aspect combinable with any of the previous aspects, the multiple heat exchangers include a second subset including one or more of the multiple heat exchangers thermally coupled to the second plurality of sub-units of the NGL fractionation plant.

In another aspect combinable with any of the previous aspects, the second subset includes a sixth heat exchanger thermally coupled to the de-pentanizer section, and configured to heat a sixth buffer stream using heat carried by a de-pentanizer overhead outlet stream from the de-pentanizer section. The second subset includes a seventh heat exchanger thermally coupled to the ADIP regeneration section, and configured to heat a seventh buffer stream using heat carried by an ADIP regeneration section overhead outlet stream. The second subset includes an eighth heat exchanger thermally coupled to the ADIP regeneration section, and configured to heat an eighth buffer stream using heat carried by an ADIP regeneration section bottoms outlet stream. The second subset includes a ninth heat exchanger thermally coupled to the natural gas de-colorizing section, and configured to heat a ninth buffer stream using heat carried by a natural gas de-colorizing section pre-flash drum overhead outlet stream. The second subset includes a tenth heat exchanger thermally coupled to the natural gas de-colorizing section, and configured to heat a tenth buffer stream using heat carried by a natural gas de-colorizer overhead outlet stream. The second subset includes an eleventh heat exchanger thermally coupled to the propane vapor recovery section, and configured to heat an eleventh buffer stream using heat carried by a propane vapor recovery compressor outlet stream. The third subset includes a twelfth heat exchanger thermally coupled to the propane product refrigeration section, and configured to heat a twelfth buffer stream using heat carried by a propane refrigeration compressor outlet stream from the propane product refrigeration section.

In another aspect combinable with any of the previous aspects, the multiple heat exchangers include a third subset including one or more of the multiple heat exchangers thermally coupled to the third plurality of sub-units of the NGL fractionation plant.

In another aspect combinable with any of the previous aspects, the third subset includes a thirteenth heat exchanger thermally coupled to the propane product sub-cooling, and configured to heat a thirteenth buffer stream using heat carried by a propane main compressor outlet stream from the propane product sub-cooling section. The third subset includes a fourteenth heat exchanger thermally coupled to the butane product refrigeration section, and configured to heat a fourteenth buffer stream using heat carried by a butane refrigeration compressor outlet stream from the butane product refrigeration section. The third subset includes a fifteenth heat exchanger thermally coupled to the ethane production section, and configured to heat a fifteenth buffer stream using heat carried by an ethane dryer outlet stream. The third subset includes a sixteenth heat exchanger thermally coupled to the RVP control section, and configured to heat a sixteenth buffer stream using heat carried by a RVP control column overhead outlet stream.

In another aspect combinable with any of the previous aspects, the system includes a storage tank configured to store the buffer streams. The control system is configured to flow the buffer streams from the storage tank to the heat exchanger network.

In another aspect combinable with any of the previous aspects, the buffer stream includes pressurized water.

In another aspect combinable with any of the previous aspects, the first sub-system includes a modified multi-effect-distillation (MED) system configured to produce potable water using at least the portion of heat recovered by the heat exchanger network. The MED system includes multiple trains. Each train is configured to receive the heated buffer fluid from the heat exchanger network and to produce potable water using the heat carried by the heated buffer fluid.

In another aspect combinable with any of the previous aspects, the MED system includes three trains. A first train includes six effects, a second train includes four effects and a third train includes two effects.

In another aspect combinable with any of the previous aspects, the second sub-system includes a cooling sub-system configured to generate cooling capacity to cool at least a portion of the NGL fractionation plant.

In another aspect combinable with any of the previous aspects, the cooling sub-system includes a mono-refrigerant dual vapor compressor-ejector cycle.

In another aspect combinable with any of the previous aspects, the compressor-ejector cycle includes a first propane stream that is vaporized to generate the cooling capacity.

In another aspect combinable with any of the previous aspects, the third subset includes a third subset of heat exchangers including a seventeenth heat exchanger thermally coupled to the de-ethanizer section, and configured to heat the first propane stream using heat carried by a de-ethanizer refrigeration compressor outlet stream from the de-ethanizer section.

In another aspect combinable with any of the previous aspects, the MED system can include a first phase comprising three trains. A first train in the first phase can include six effects, a second train in the first phase can include four effects and a third train in the first phase can include two effects.

In another aspect combinable with any of the previous aspects, the MED system can include a second phase including three trains. The second phase can be connected in parallel with the first phase. A fourth train in the second phase can include five effects, a fifth train in the second phase can include four effects and a sixth train in the second phase can include two effects.

In another aspect combinable with any of the previous aspects, the MED system can include a third phase including one train, the third phase connected in parallel with the second phase.

The details of one or more implementations of the subject matter described in this specification are set forth in the accompanying drawings and the detailed description. Other features, aspects, and advantages of the subject matter will become apparent from the description, the drawings, and the claims.

BRIEF DESCRIPTION OF THE DRAWINGS

FIG. 1O is a schematic diagram of an integrated, customized, mono-refrigerant dual vapor compressor-ejector cycle.

DETAILED DESCRIPTION

NGL Plant

Figure 1A:
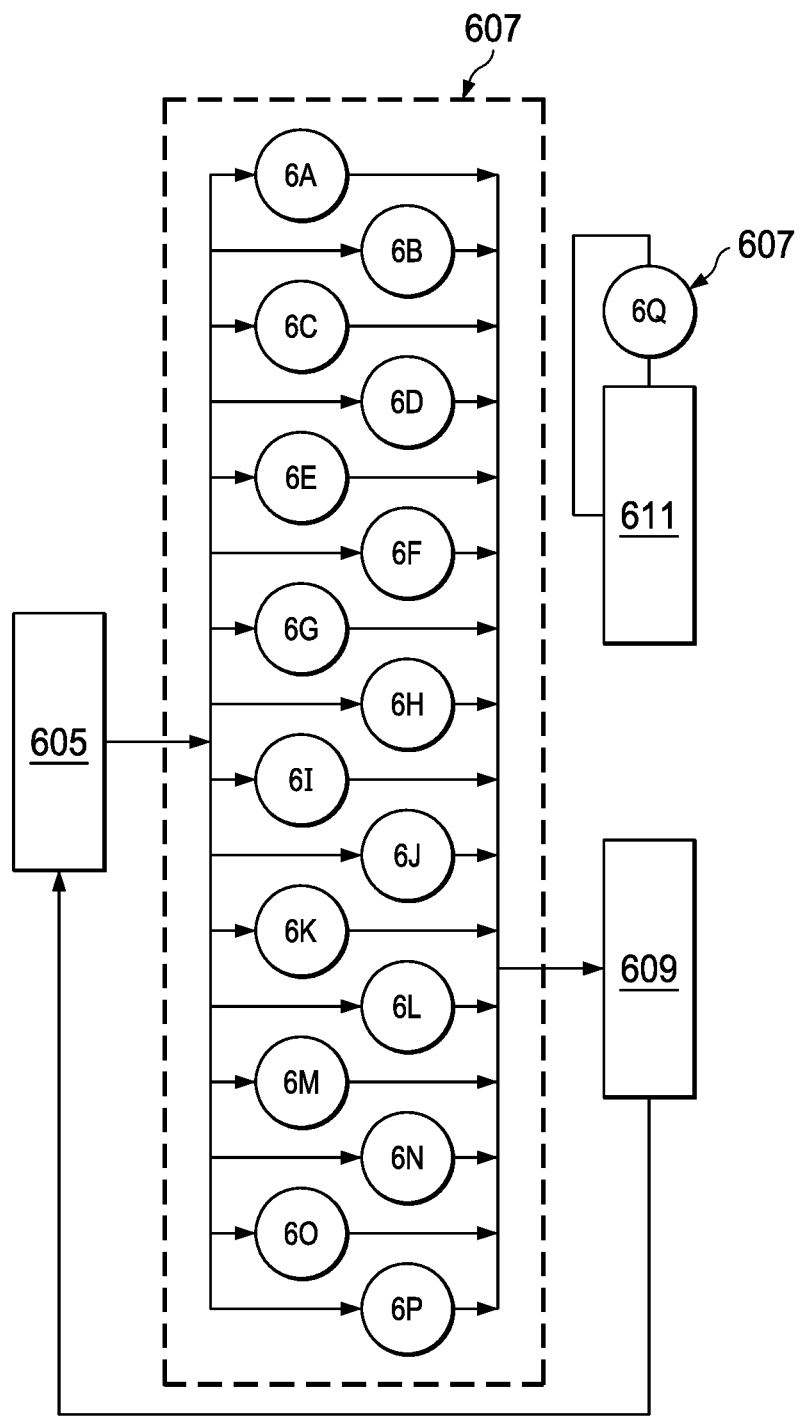
FIG. 1A is a schematic diagram of an example of a low grade waste heat recovery system.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a de-pentanizer condenser, an amine-di-isopropanol (ADIP) cooler, a regenerator overhead (OVHD) condenser, a Reid vapor pressure (RVP) column condenser, a de-propanizer condenser, a de-butanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG de-colorizer condenser, or combinations thereof.

Fractionation Section

Fractionation is the process of separating the different components of natural gas. Separation is possible because each component has a different boiling point. At temperatures less than than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. De-ethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL". De-propanizing and de-butanizing separate propane and butane, respectively, from C3+ NGL and C4+NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the de-ethanizer, about 50 trays in the de-propanizer, and about 55 trays in the de-butanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the de-ethanizing module, the de-propanizing module and the de-butanizing module, each of which is described later.

De-Ethanizer Module (or De-Ethanizer Column)

The C2+ NGL is pre-heated before entering the de-ethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the de-ethanizer reboiler is C3+ NGL, which is sent to the de-propanizer module.

De-Propanizer Module (or De-Propanizer Column)

From the de-ethanizer module, C3+ NGL enters the de-propanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the de-butanizer module De-Butanizer Module (or De-Butanizer Column)

C4+ enters the de-butanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two de-hydrators containing molecular sieve desiccant beds. One de-hydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the de-hydrator, dry C3/C4 products flow to refrigeration.

Natural Gasoline (NG) Processing Section

NG processing includes RVP control, de-colorizing and de-pentanizing sections.

RVP Control Section

A Reid vapor pressure (RVP) control section (or rerun unit) is a fractionator column that receives the C5+ NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

De-Colorizing Section

The de-colorizing section removes color bodies from NG. Color bodies are traces of heavy ends found in the de-butanizer bottoms product. Other impurities such as corrosion products from the pipeline may also be present. These must be removed for NG to meet the color specification. De-colorizer feed can be RVP column bottoms product or de-butanizer bottoms product, or a combination of both.

Additional natural gasoline can also be supplied from other facilities to maintain a hexane plus (C6+) product supply. If de-colorizing is needed, NG first passes through a pre-flash-drum. A large portion of the lighter NG components vaporizes and leaves the drum as overhead. The heavier NG components remain along with the color bodies and are fed to the de-colorizer column, where the remaining color bodies are separated. The NG leaves the de-colorizer as overhead gas and is condensed and collected in the NG product drum, with some pumped back to the column as reflux. Overhead from the column and flash drum are joined and pumped to either the de-pentanizer (described later) or cooled and sent to storage in the feed product surge unit. The color bodies leave the de-colorizer as bottoms product and are pumped to the feed and surge unit to be injected into a crude line.

De-Pentanizing Section

De-pentanizing uses a fractionation column to produce a pentane overhead product and a C6+ bottoms product. Both the pentane product and the C6+ bottoms product are separately fed to storage or downstream the petrochemical plants. The feed to the de-pentanizer is the NG product stream from the de-colorizing section. Feed can be increased or decreased based on the demand for C6+ bottoms product. If the NGL fractionation plant NG production cannot meet demand, NG can be imported from oil refineries. The de-colorized NG is preheated before entering the de-pentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the de-pentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
|---|---|
| Propane refrigerant condenser | 94 |
| Propane de-hydration condenser | 22 |
| Butane de-hydrator condenser | 9 |
| Naphtha cooler | 11 |
| De-pentanizer condenser | 100 |
| ADIP cooler | 73 |
| Regenerator OVHD condenser | 18 |
| NG flash vapor condenser | 107 |
| NG de-colorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| De-propanizer condenser | 194 |
| De-butanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

In some implementations, the techniques described here can be implemented using a waste heat recovery network that includes 17 heat exchanger units distributed in specific areas of the NGL fractionation plant. As described later, low grade waste heat can be recovered from several processing units at which the heat exchanger units are installed using two buffer streams, for example, pressurized water, pressurized liquid propane, oil or such buffer streams. The pressurized water can flow from a dedicated storage tank at a temperature of between 115° F. and 125° F. (for example, a temperature of 120° F.) towards specific units in the NGL fractionation plant to recover a specific amount of thermal energy.

The techniques can be implemented to increase the temperature of a first pressurized water stream from about 120° F. to between 150° F. and 160° F. (for example, about 158° F.) by absorbing thermal energy between 2400 MM Btu/h and 2600 MM Btu/h (for example, 2500 MM Btu/h). The pressurized water stream at about 158° F. is used to drive a modified multi-effect-distillation (MED) system to produce desalinated water from brackish water or sea water stream at the rate of about 114,000 $m^3$/day. The temperature of the pressurized water stream is reduced back to about 120° F. The pressurized water then flows back to the storage tank and the processes are repeated.

The techniques can also be implemented to cause the second pressurized liquid propane stream to absorb between 350 MM Btu/h and 450 MM Btu/h (for example, about 400 MM plant Btu/h) from the NGL fractionation plant. The absorbed thermal energy generates between 90 MM Btu/h and 100 MM Btu/h (for example, 98 MM Btu/h) of sub-ambient cooling capacity, which is used in the plant mechanical compression based refrigeration system for the system propane refrigerant sub-cooling using vapor-ejector to decrease the plant refrigeration system power consumption by between 10 MW and 20 MW (for example, about 14 MW). The second buffer stream of propane liquid at high pressure is vaporized in a heat exchanger (described and shown later), and used as a motive vapor in the ejector, then condensed in a water cooler to be reused back in the cycle.

FIG. 1A is a schematic diagram of an example of a low grade waste heat recovery system. The schematic includes a storage tank 605 to store buffer fluid, for example, pressurized water, oil, or other buffer fluid. The buffer fluid is flowed to a heat exchanger network 607 which, in some implementations, can include seventeen heat exchangers (for example, heat exchangers 6a, 6b, 6c, 6d, 6e, 6f, 6g, 6h, 6i, 6j, 6k, 6l, 6m, 6n, 6o, 6p and 6q), which are described in detail later. The buffer fluid is flowed through the heat exchanger network 607 and heated by streams in the NGL fractionation plant (described later). The heated buffer fluid is flowed to a MED system 609 that can generate potable water as described later. The temperature of the buffer fluid decreases as it exits the MED system 609 and flows back to the storage tank 605 to be flowed again through the heat exchanger network 607. The system also includes a cooling sub-system 611 (described later) that includes a second buffer stream, for example, pressurized propane that can be heated using one or more of the heat exchangers in the heat exchanger network 607 to reduce the cooling requirement of the cooling sub-system. The second buffer fluid sub-cools the compressor feed stream and thus reduces the compressor feed vapor density, which, in turn, reduces the power consumption of the refrigeration compressor. In some implementations, the techniques described here can be implemented with one of the MED system 609 or the cooling sub-system 611 and without the other of the MED system 609 or the cooling sub-system 611.

Figure 1B:
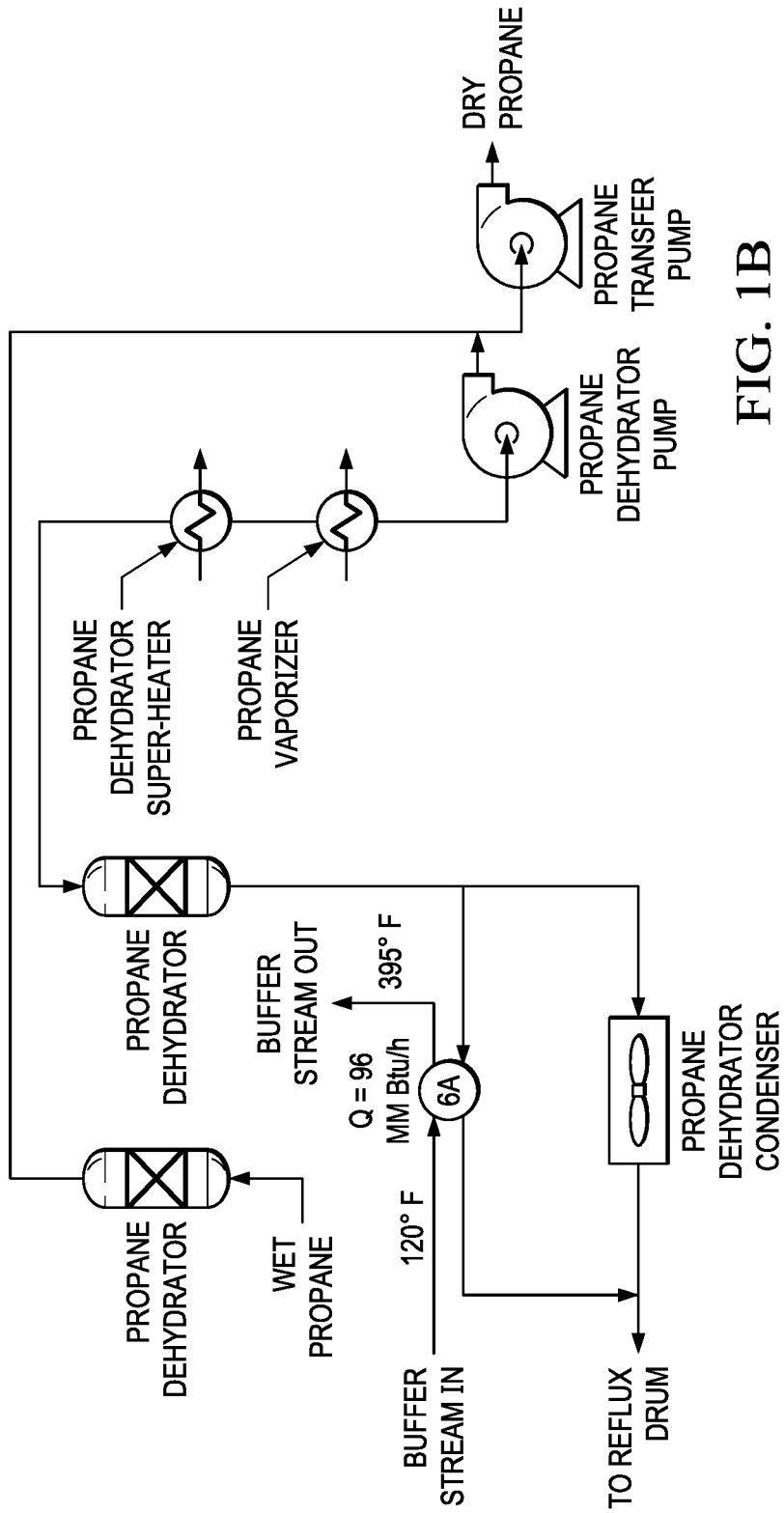
FIG. 1B is a schematic diagram of a propane de-hydration section waste heat recovery system in a NGL fractionation plant.

FIG. 1B is a schematic diagram of a propane de-hydration section waste heat recovery system in a NGL fractionation plant. A first heat exchanger 6a is located in the propane de-hydration section of the NGL fractionation plant. In some implementations, the buffer fluid in the storage tank 605 is pressurized water at a temperature of between 115° F. and 125° F. (for example, about 120° F.). The pressurized water stream flows from the storage tank 605 to the first heat exchanger 6a to cool down the propane de-hydration outlet stream. In turn, the temperature of the pressurized water stream increases to between 390° F. and 400° F. (for example, about 395° F.). The heated pressurized water stream flows to the collection header to join other pressurized water streams to flow to the MED system 609. The total thermal duty of the first heat exchanger 6a is between 95 MM Btu/h and 100 MM Btu/h (for example, about 96 MM Btu/h).

Figure 1C:
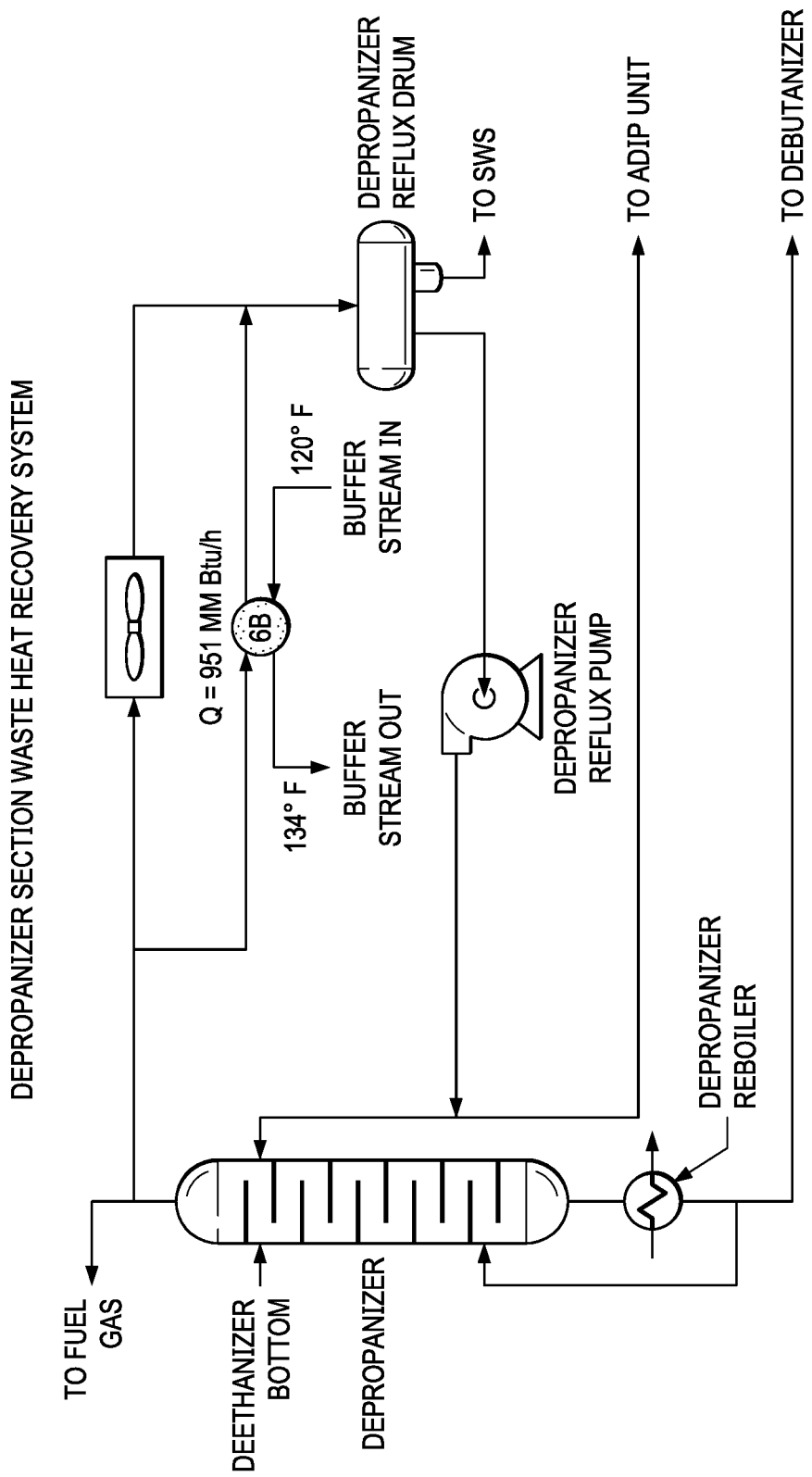
FIG. 1C is a schematic diagram of a de-propanizer section waste heat recovery system in a NGL fractionation plant.

FIG. 1C is a schematic diagram of a de-propanizer section waste heat recovery system in the NGL fractionation plant. A second heat exchanger 6b is located in the de-propanizer section of the NGL fractionation plant. The pressurized water stream flows from the storage tank 605 to the second heat exchanger 6b to cool down the de-propanizer overhead outlet stream. In turn, the temperature of the pressurized water stream increases to between 130° F. and 140° F. (for example, about 134° F.). The heated pressurized water stream flows to the collection header to join other pressurized water streams to flow to the MED system 609. The total thermal duty of the second heat exchanger 6b is between 950 MM Btu/h and 960 MM Btu/h (for example, about 951 MM Btu/h).

Figure 1D:
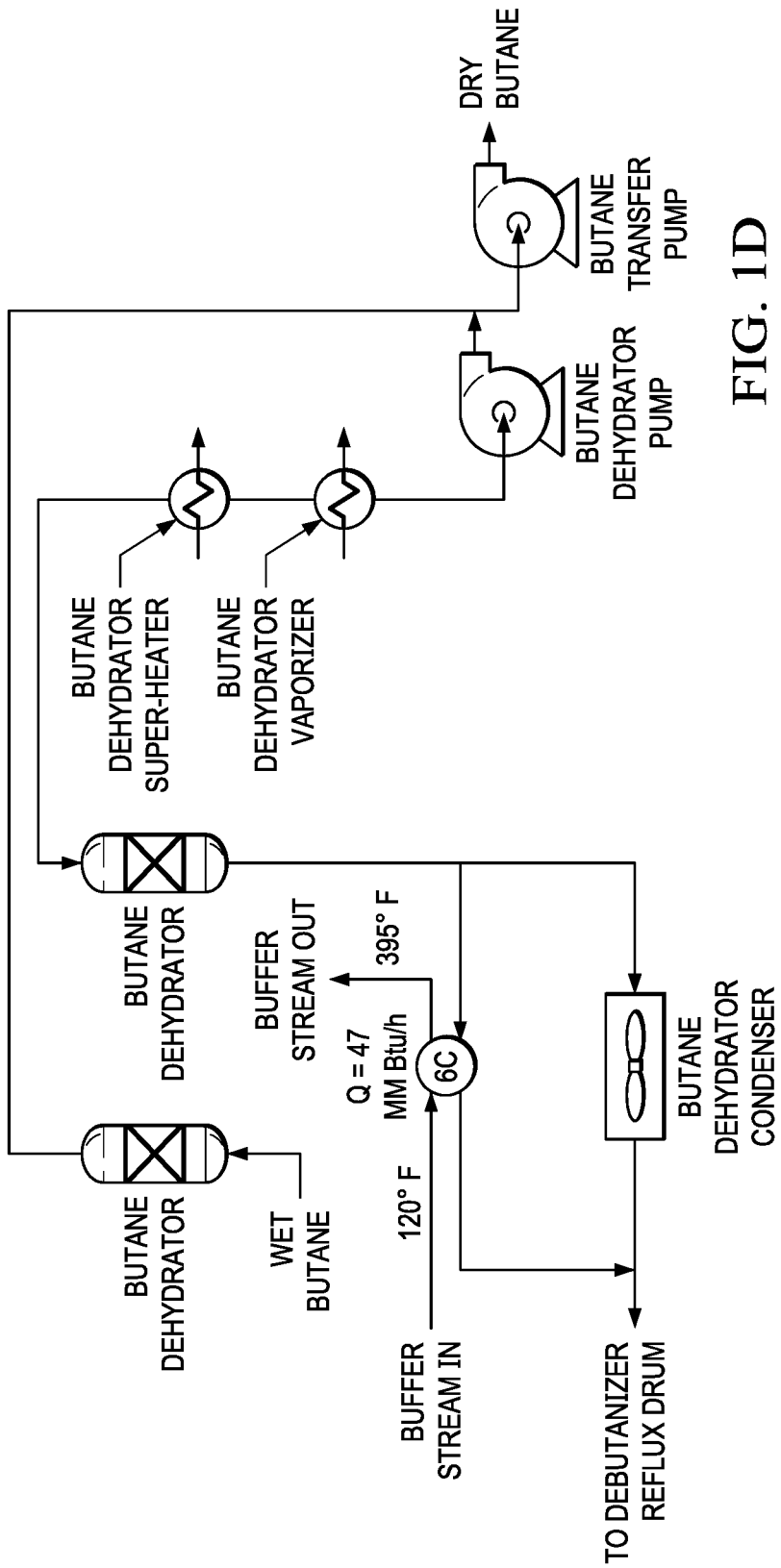
FIG. 1D is a schematic diagram of a butane de-hydrator section waste heat recovery system in a NGL fractionation plant.

FIG. 1D is a schematic diagram of a butane de-hydrator section waste heat recovery system in the NGL fractionation plant. A third heat exchanger 6c is located in the butane de-hydrator section of the NGL fractionation plant. The pressurized water stream flows from the storage tank 605 to the third heat exchanger 6c to cool down the butane de-hydrator outlet stream. In turn, the temperature of the pressurized water stream increases to between 390° F. and 400° F. (for example, about 395° F.). The heated pressurized water stream flows to the collection header to join other pressurized water streams to flow to the MED system 609. The total thermal duty of the third heat exchanger 6c is between 40 MM Btu/h and 50 MM Btu/h (for example, about 47 MM Btu/h).

Figure 1E:
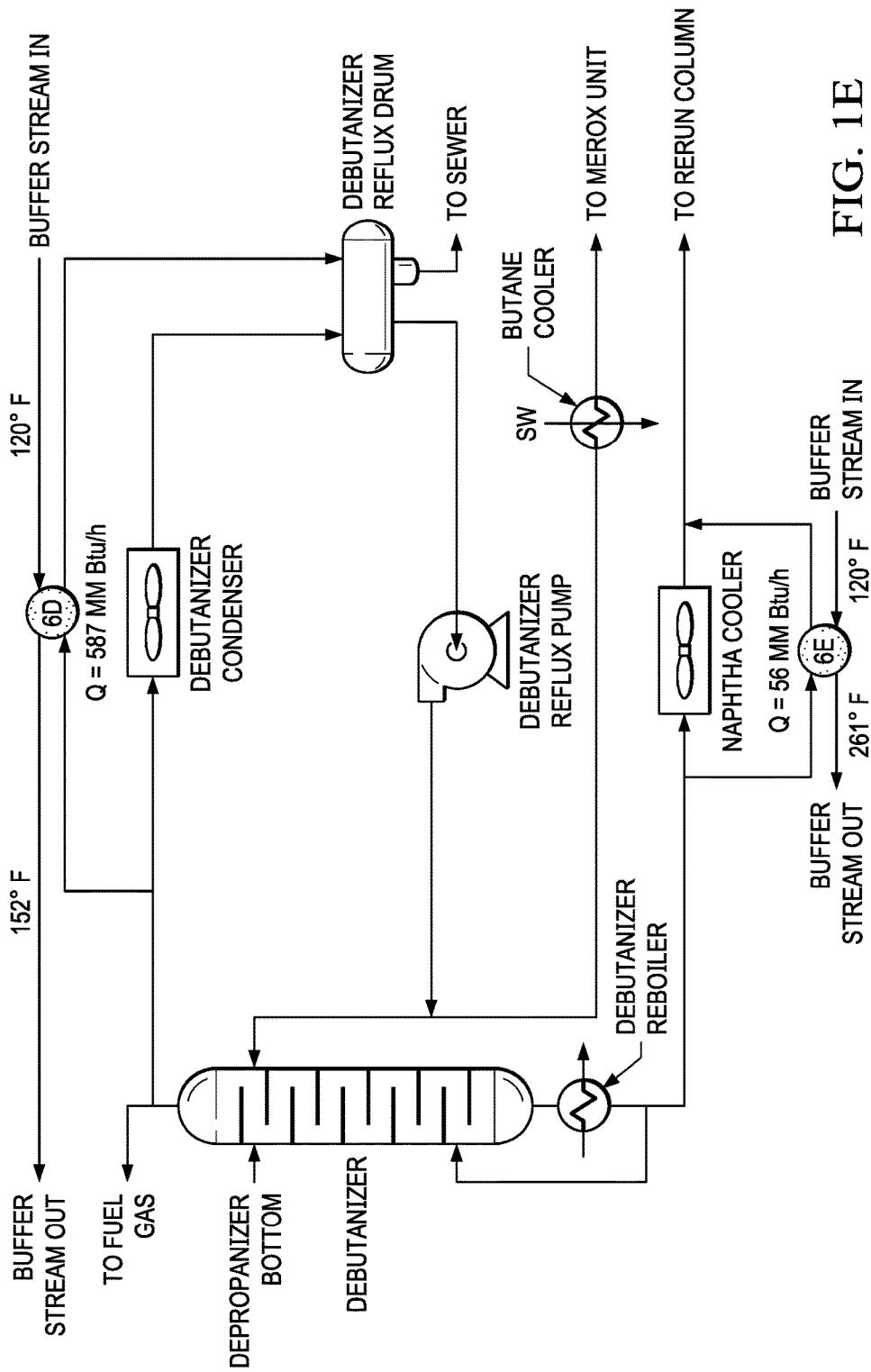
FIG. 1E is a schematic diagram of a de-butanizer section waste heat recovery system in a NGL fractionation plant.

FIG. 1E is a schematic diagram of a de-butanizer section waste heat recovery system in the NGL fractionation plant. A fourth heat exchanger 6d is located in the de-butanizer section of the NGL fractionation plant. The pressurized water stream flows from the storage tank 605 to the fourth heat exchanger 6d to cool down the de-butanizer overhead outlet stream. In turn, the temperature of the pressurized water stream increases to between 150° F. and 160° F. (for example, about 152° F.). The heated pressurized water stream flows to the collection header to join other pressurized water streams to flow to the MED system 609. The total thermal duty of the fourth heat exchanger 6d is between 580 MM Btu/h and 590 MM Btu/h (for example, about 587 MM Btu/h).

Also as shown in FIG. 1E, a fifth heat exchanger 6e is located in the de-butanizer section of the NGL fractionation plant. The pressurized water stream flows from the storage tank 605 to the fifth heat exchanger 6e to cool down the de-butanizer bottoms outlet stream. In turn, the temperature of the pressurized water stream increases to between 255° F. and 265° F. (for example, about 261° F.). The heated pressurized water stream flows to the collection header to join other pressurized water streams to flow to the MED system 609. The total thermal duty of the fifth heat exchanger 6e is between 50 MM Btu/h and 60 MM Btu/h (for example, about 56 MM Btu/h).

Figure 1F:
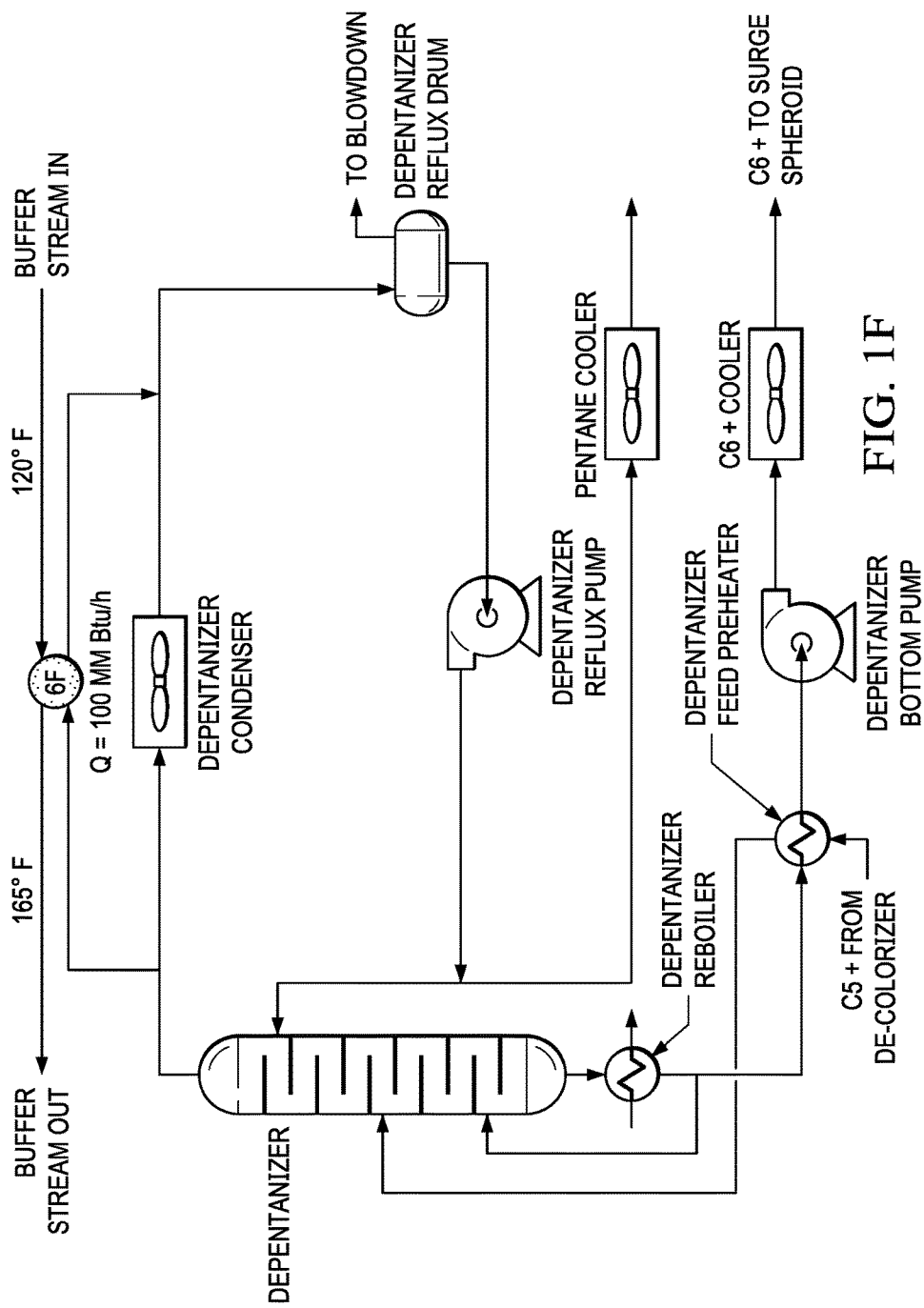
FIG. 1F is a schematic diagram of a de-pentanizer section waste heat recovery system in a NGL fractionation plant.

FIG. 1F is a schematic diagram of a de-pentanizer section waste heat recovery system in the NGL fractionation plant. A sixth heat exchanger 6f is located in the de-pentanizer section of the NGL fractionation plant. The pressurized water stream flows from the storage tank 605 to the sixth heat exchanger 6f to cool down the de-pentanizer overhead outlet stream. In turn, the temperature of the pressurized water stream increases to between 160° F. and 170° F. (for example, about 165° F.). The heated pressurized water stream flows to the collection header to join other pressurized water streams to flow to the MED system 609. The total thermal duty of the sixth heat exchanger 6f is between 95 MM Btu/h and 105 MM Btu/h (for example, about 100 MM Btu/h).

Figure 1G:
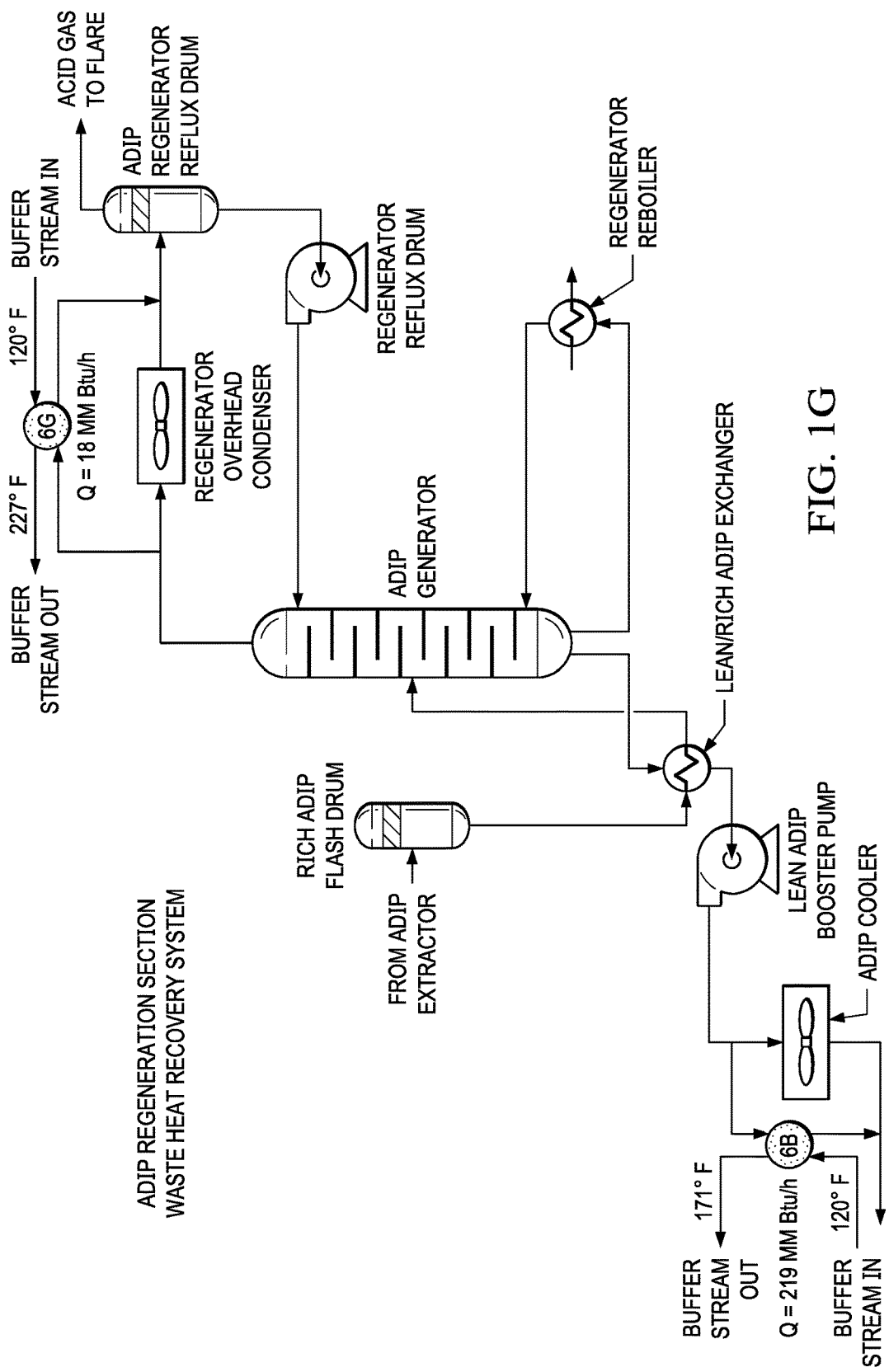
FIG. 1G is a schematic diagram of an ADIP regeneration section waste heat recovery system in a NGL fractionation plant.

FIG. 1G is a schematic diagram of an ADIP regeneration section waste heat recovery system in the NGL fractionation plant. A seventh heat exchanger 6g is located in the ADIP regeneration section of the NGL fractionation plant. The pressurized water stream flows from the storage tank 605 to the seventh heat exchanger 6g to cool down the ADIP regeneration section overhead outlet stream. In turn, the temperature of the pressurized water stream increases to between 220° F. and 230° F. (for example, about 227° F.). The heated pressurized water stream flows to the collection header to join other pressurized water streams to flow to the MED system 609. The total thermal duty of the seventh heat exchanger 6g is between 10 MM Btu/h and 20 MM Btu/h (for example, about 18 MM Btu/h).

Also as shown in FIG. 1G, an eighth heat exchanger 6h is located in the ADIP regeneration section of the NGL fractionation plant. The pressurized water stream flows from the storage tank 605 to the eighth heat exchanger 6h to cool down the ADIP regeneration section bottoms outlet stream. In turn, the temperature of the pressurized water stream increases to between 165° F. and 175° F. (for example, about 171° F.). The heated pressurized water stream flows to the collection header to join other pressurized water streams to flow to the MED system 609. The total thermal duty of the eighth heat exchanger 6h is between 215 MM Btu/h and 225 MM Btu/h (for example, about 219 MM Btu/h).

Figure 1H:
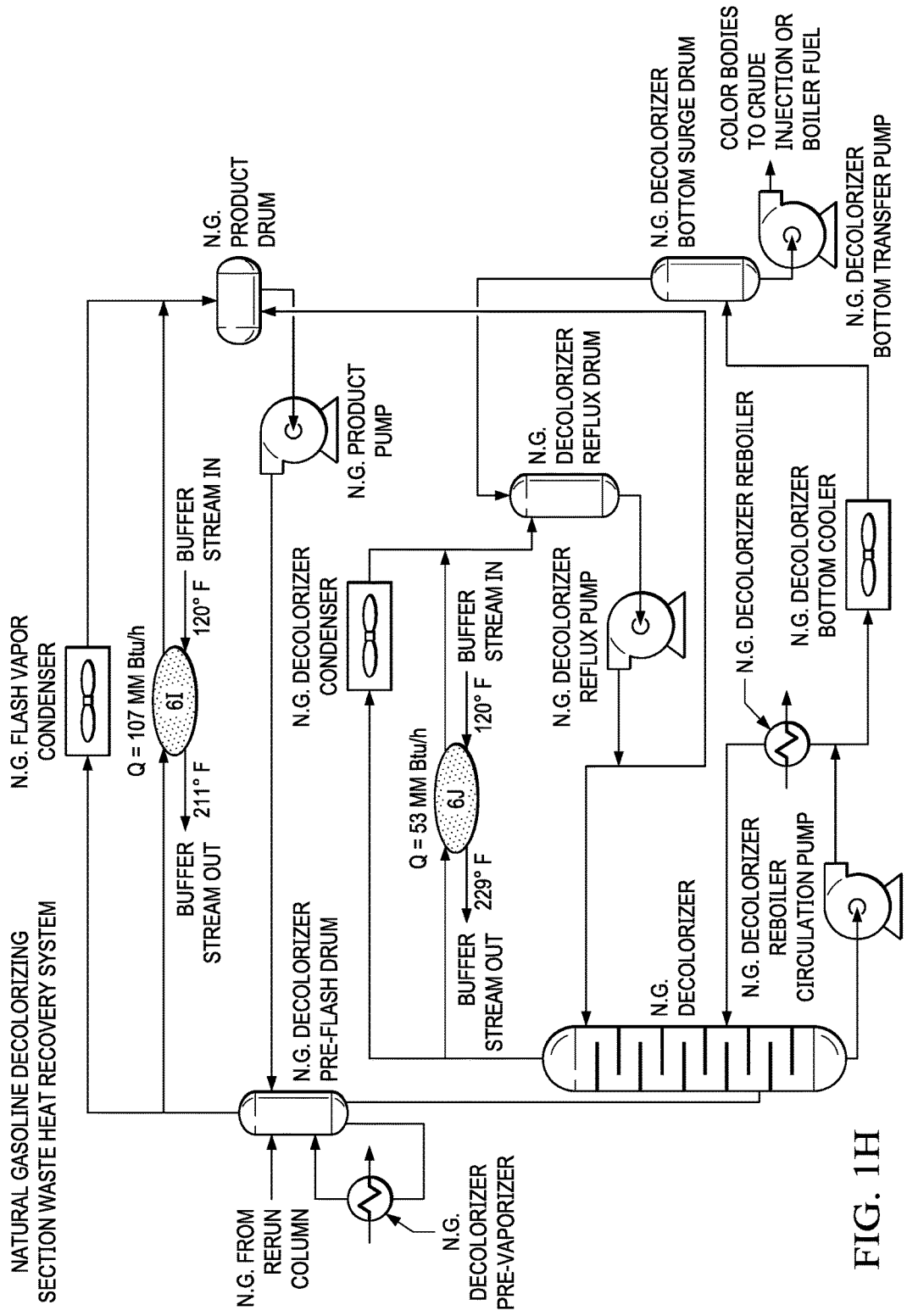
FIG. 1H is a schematic diagram of a natural gasoline de-colorizing section waste heat recovery system in a NGL fractionation plant.

FIG. 1H is a schematic diagram of a natural gasoline de-colorizing section waste heat recovery system in the NGL fractionation plant. A ninth heat exchanger 6i is located in the natural gasoline de-colorizing section of the NGL fractionation plant. The pressurized water stream flows from the storage tank 605 to the ninth heat exchanger 6i to cool down the natural gas de-colorizing section pre-flash drum overhead outlet stream. In turn, the temperature of the pressurized water stream increases to between 205° F. and 215° F. (for example, about 211° F.). The heated pressurized water stream flows to the collection header to join other pressurized water streams to flow to the MED system 609. The total thermal duty of the ninth heat exchanger 6i is between 100 MM Btu/h and 110 MM Btu/h (for example, about 107 MM Btu/h).

A tenth heat exchanger 6j is located in the natural gasoline de-colorizing section of the NGL fractionation plant. The pressurized water stream flows from the storage tank 605 to the tenth heat exchanger 6j to cool down the natural gas de-colorizer overhead outlet stream. In turn, the temperature of the pressurized water stream increases to between 225° F. and 235° F. (for example, about 229° F.). The heated pressurized water stream flows to the collection header to join other pressurized water streams to flow to the MED system 609. The total thermal duty of the tenth heat exchanger 6j is between 50 MM Btu/h and 55 MM Btu/h (for example, about 53 MM Btu/h).

Figure 1I:
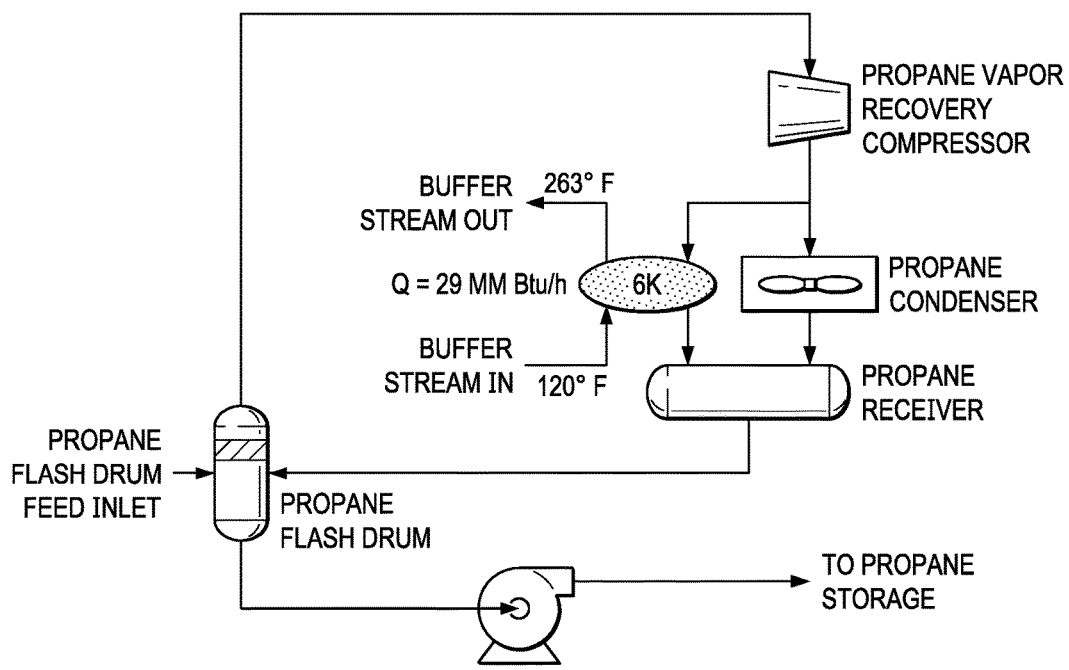
FIG. 1I is a schematic diagram of a propane tank vapor recovery section waste heat recovery system in a NGL fractionation plant.

FIG. 1I is a schematic diagram of a propane tank vapor recovery section waste heat recovery system in the NGL fractionation plant. An eleventh heat exchanger 6k is located in the propane tank vapor section of the NGL fractionation plant. The pressurized water stream flows from the storage tank 605 to the eleventh heat exchanger 6k to cool down the propane vapor recovery compressor outlet stream. In turn, the temperature of the pressurized water stream increases to between 260° F. and 270° F. (for example, about 263° F.). The heated pressurized water stream flows to the collection header to join other pressurized water streams to flow to the MED system 609. The total thermal duty of the eleventh heat exchanger 6k is between 25 MM Btu/h and 35 MM Btu/h (for example, about 29 MM Btu/h).

Figure 1J:
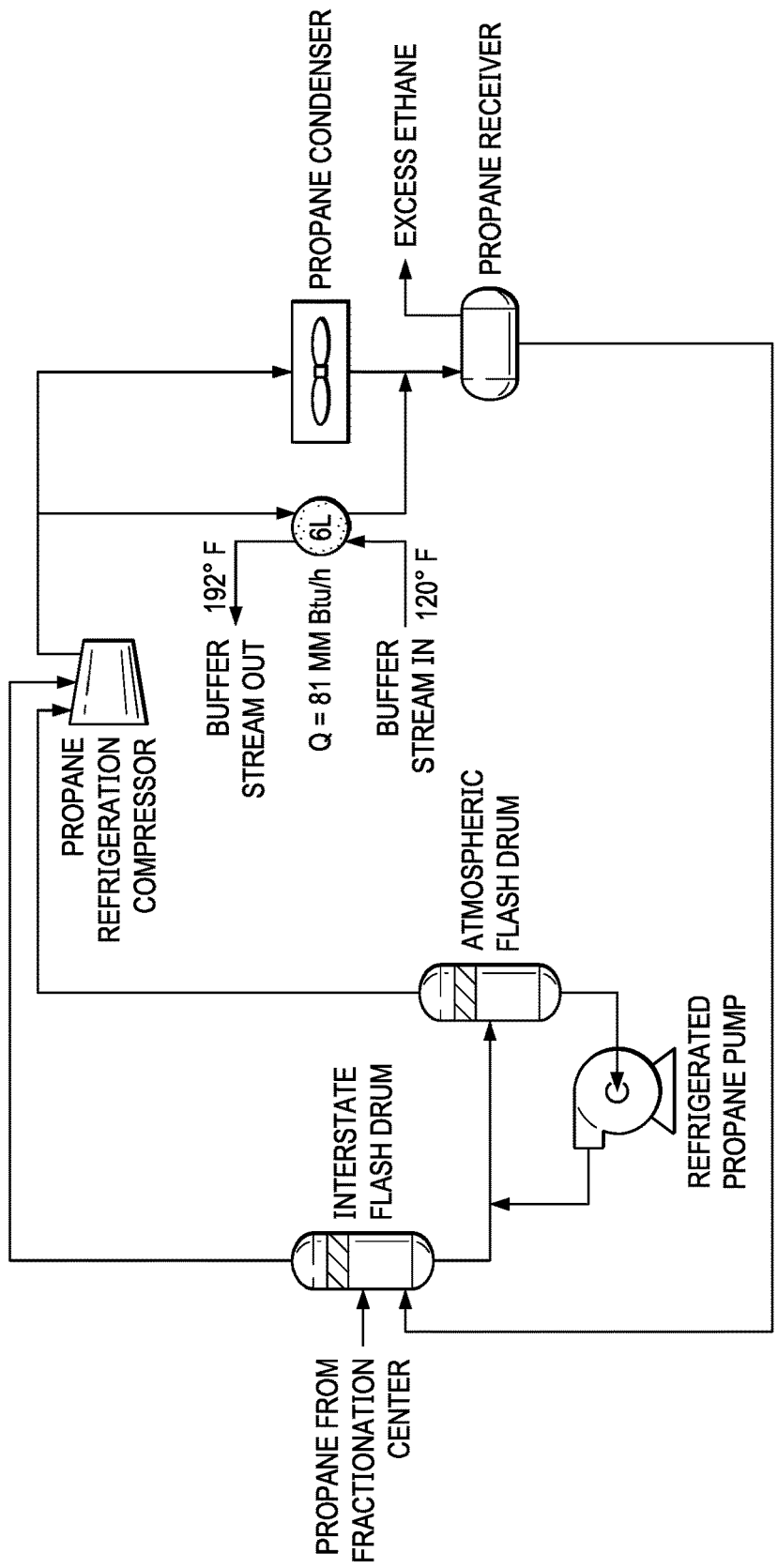
FIG. 1J is a schematic diagram of a propane product refrigeration section waste heat recovery system in a NGL fractionation plant.

FIG. 1J is a schematic diagram of a propane product refrigeration section waste heat recovery system in the NGL fractionation plant. A twelfth heat exchanger 6l is located in the propane product refrigeration section of the NGL fractionation plant. The pressurized water stream flows from the storage tank 605 to the twelfth heat exchanger 6l to cool down the propane refrigeration compressor outlet stream. In turn, the temperature of the pressurized water stream increases to between 185° F. and 195° F. (for example, about 192° F.). The heated pressurized water stream flows to the collection header to join other pressurized water streams to flow to the MED system 609. The total thermal duty of the twelfth heat exchanger 6l is between 75 MM Btu/h and 85 MM Btu/h (for example, about 81 MM Btu/h).

Figure 1K:
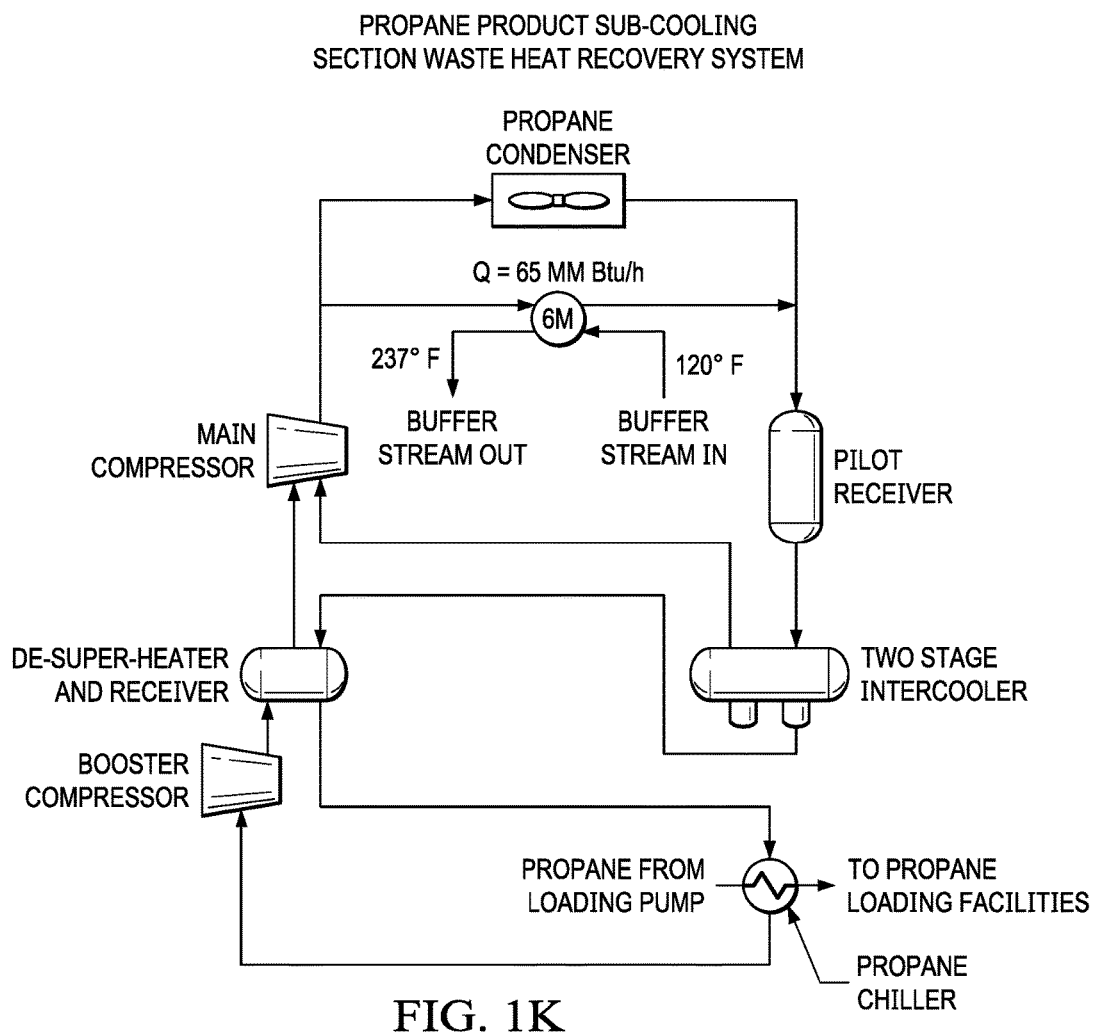
FIG. 1K is a schematic diagram of a propane product sub-cooling section waste heat recovery system in a NGL fractionation plant.

FIG. 1K is a schematic diagram of a propane product sub-cooling section waste heat recovery system in the NGL fractionation plant. A thirteenth heat exchanger 6m is located in the propane product sub-cooling section of the NGL fractionation plant. The pressurized water stream flows from the storage tank 605 to the thirteenth heat exchanger 6m to cool down the propane main compressor outlet stream. In turn, the temperature of the pressurized water stream increases to between 235° F. and 245° F. (for example, about 237° F.). The heated pressurized water stream flows to the collection header to join other pressurized water streams to flow to the MED system 609. The total thermal duty of the thirteenth heat exchanger 6m is between 60 MM Btu/h and 70 MM Btu/h (for example, about 65 MM Btu/h).

Figure 1L:
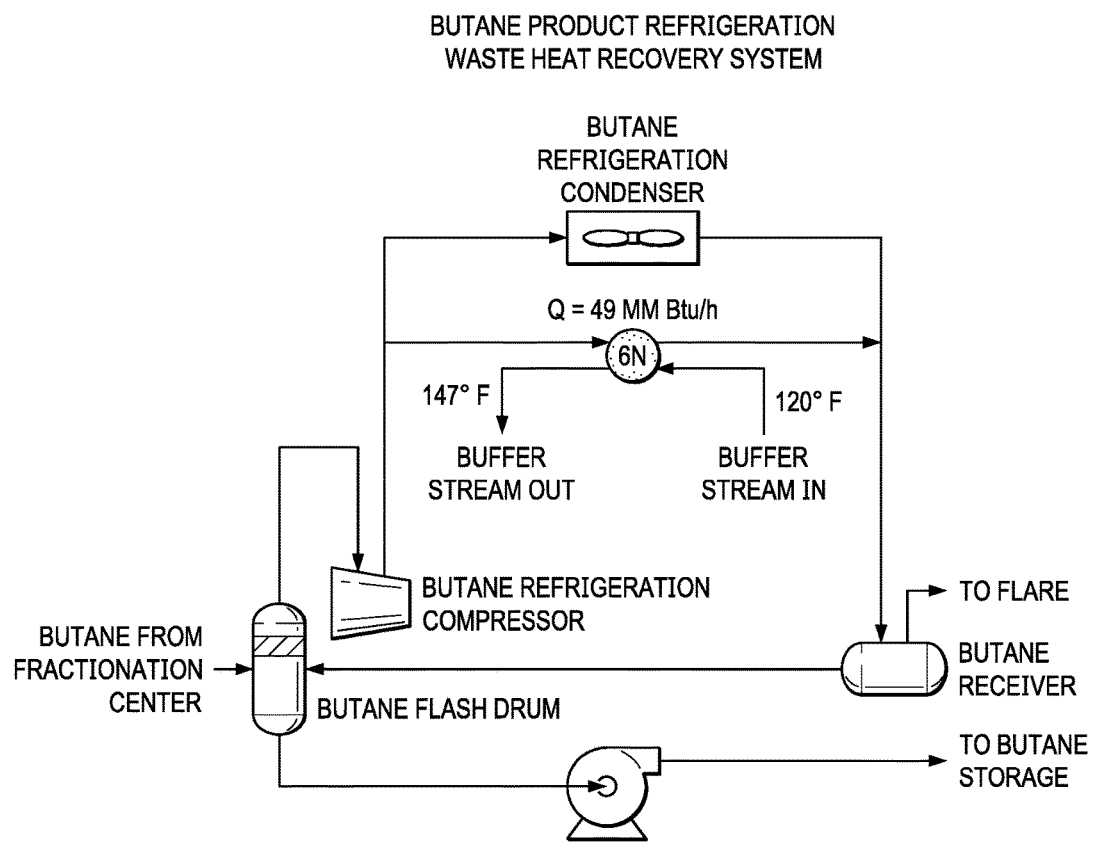
FIG. 1L is a schematic diagram of a butane product refrigeration waste heat recovery system in a NGL fractionation plant.

FIG. 1L is a schematic diagram of a butane product refrigeration waste heat recovery system in the NGL fractionation plant. A fourteenth heat exchanger 6n is located in the butane product refrigeration section of the NGL fractionation plant. The pressurized water stream flows from the storage tank 605 to the fourteenth heat exchanger 6n to cool down the butane refrigeration compressor outlet stream. In turn, the temperature of the pressurized water stream increases to between 140° F. and 150° F. (for example, about 147° F.). The heated pressurized water stream flows to the collection header to join other pressurized water streams to flow to the MED system 609. The total thermal duty of the fourteenth heat exchanger 6n is between 45 MM Btu/h and 55 MM Btu/h (for example, about 49 MM Btu/h).

Figure 1M:
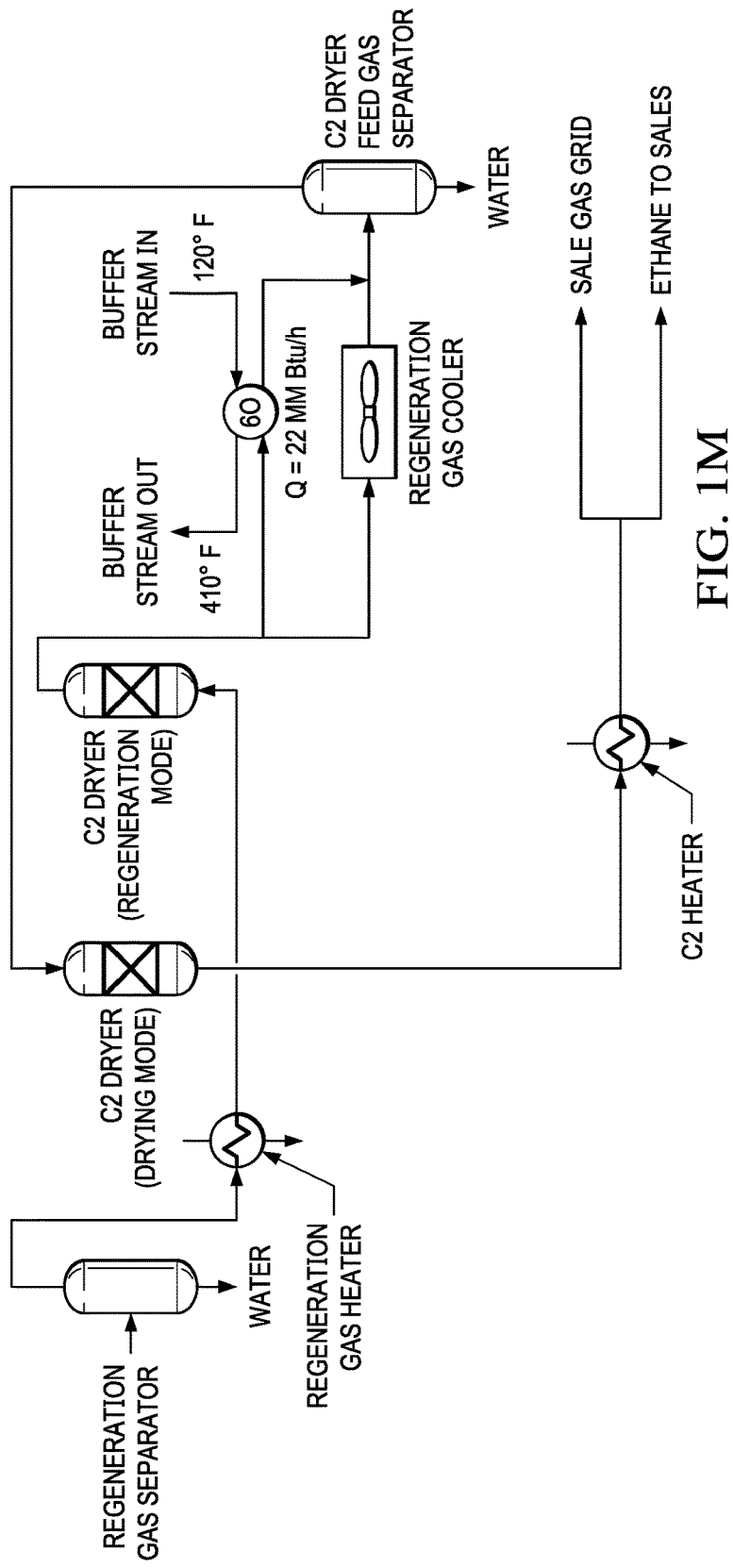
FIG. 1M is a schematic diagram of an ethane production section waste heat recovery system in a NGL fractionation plant.

FIG. 1M is a schematic diagram of an ethane production section waste heat recovery system in the NGL fractionation plant. A fifteenth heat exchanger 6o is located in the ethane production section of the NGL fractionation plant. The pressurized water stream flows from the storage tank 605 to the fifteenth heat exchanger 6o to cool down the ethane dryer outlet stream during the generation mode. In turn, the temperature of the pressurized water stream increases to between 405° F. and 415° F. (for example, about 410° F.). The heated pressurized water stream flows to the collection header to join other pressurized water streams to flow to the MED system 609. The total thermal duty of the fifteenth heat exchanger 6o is between 20 MM Btu/h and 30 MM Btu/h (for example, about 22 MM Btu/h).

Figure 1N:
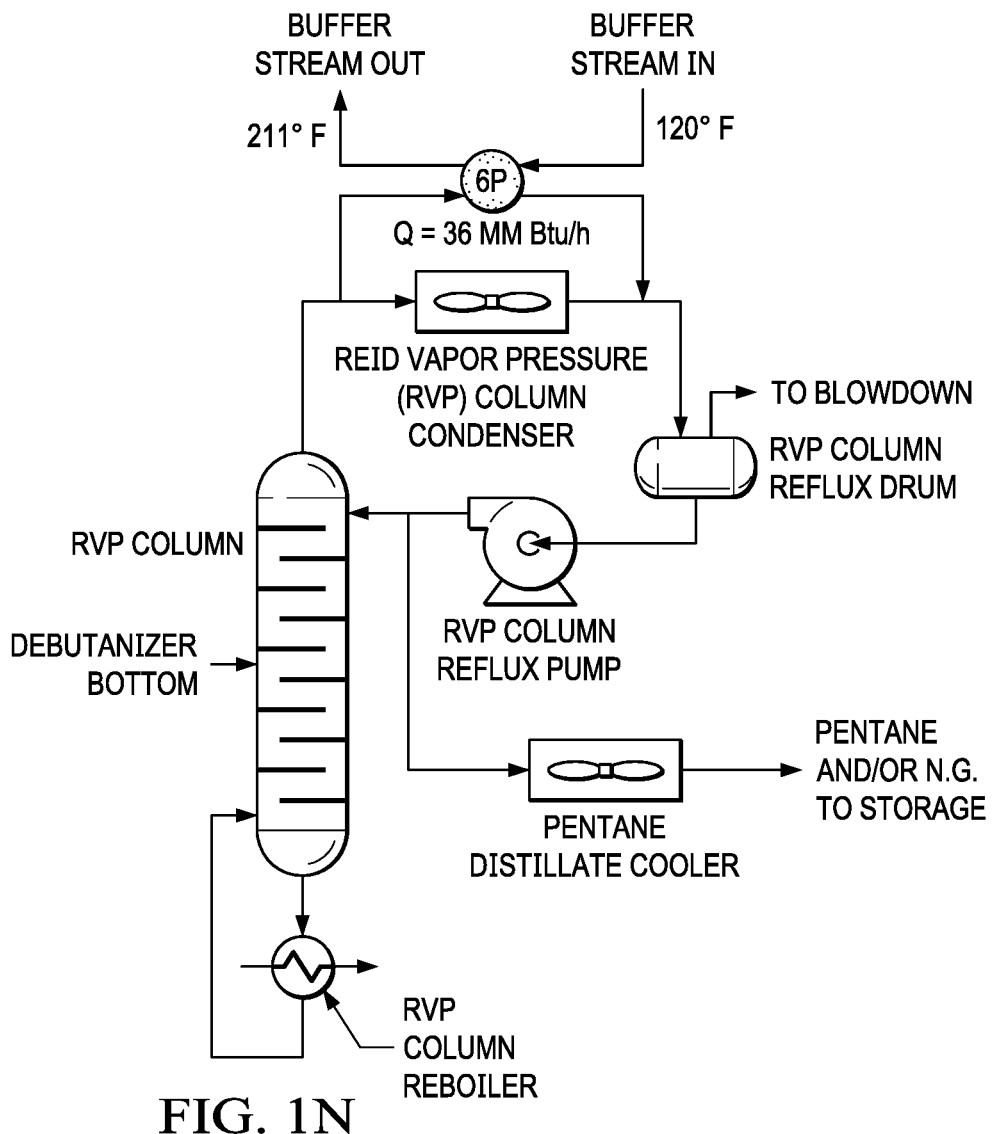
FIG. 1N is a schematic diagram of a natural gasoline vapor pressure control section waste heat recovery system in a NGL fractionation plant.
Figure 10:
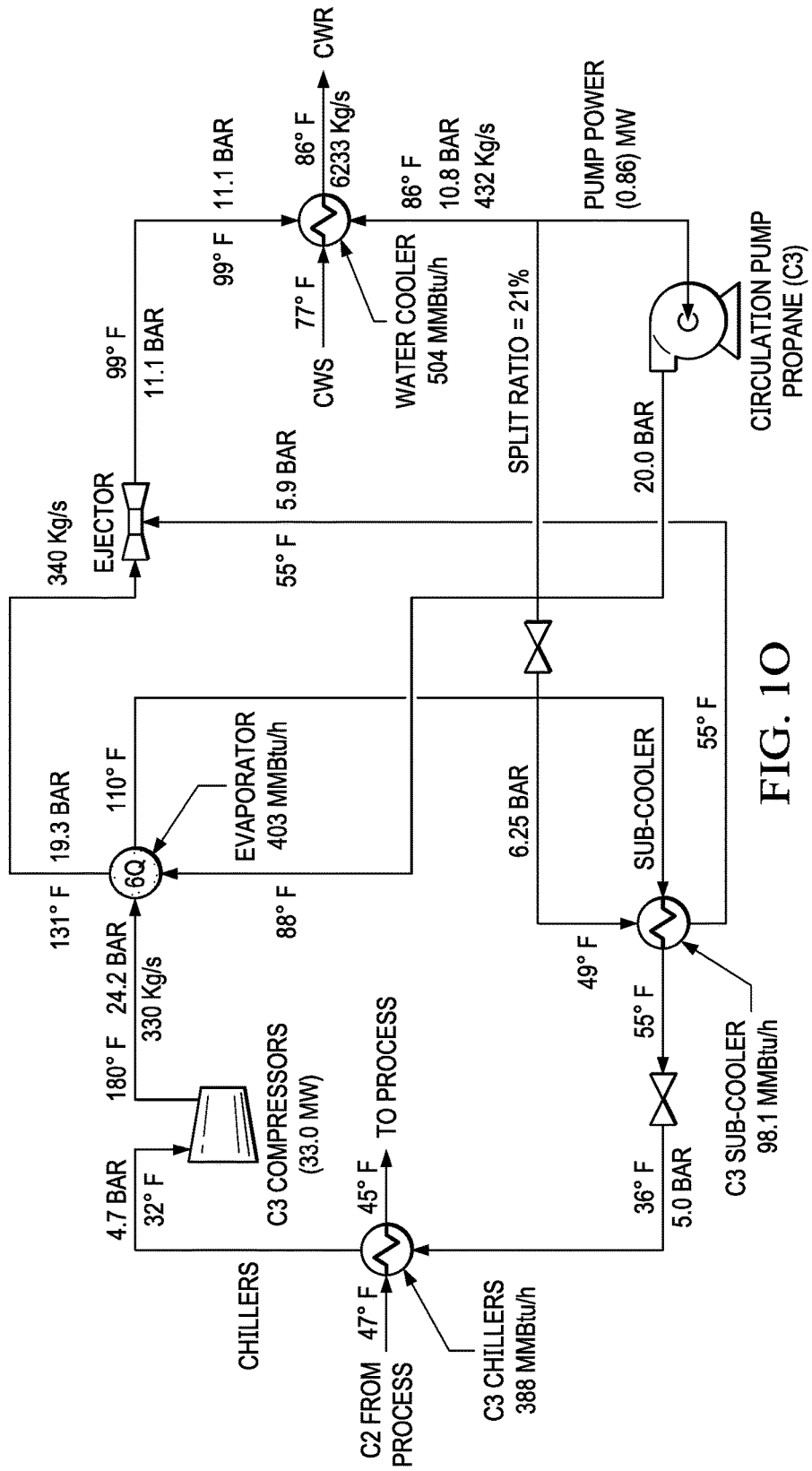

FIG. 1N is a schematic diagram of a natural gasoline vapor pressure control section waste heat recovery system in the NGL fractionation plant. A sixteenth heat exchanger 6p is located in the natural gasoline vapor pressure control section of the NGL fractionation plant. The pressurized water stream flows from the storage tank 605 to the sixteenth heat exchanger 6p to cool down the RVP control column overhead outlet stream. In turn, the temperature of the pressurized water stream increases to between 205° F. and 215° F. (for example, about 211° F.). The heated pressurized water stream flows to the collection header to join other pressurized water streams to flow to the MED system 609. The total thermal duty of the sixteenth heat exchanger 6p is between 30 MM Btu/h and 40 MM Btu/h (for example, about 36 MM Btu/h).

FIG. 1O is a schematic diagram of an integrated, customized, mono-refrigerant dual vapor compressor-ejector cycle 611. The mono-refrigerant used in the cycle is propane liquid at two identified, operating pressures to serve the mechanical compression refrigeration cycle, and the ejector refrigeration cycle for the compressor sub-cooling to reduce the main refrigeration cycle for the NGL fractionation plant by between 10 MW and 20 MW (for example, about 14.3 MW), which represents about 30% of the refrigeration package power consumption. Implementations of the cycle shown in FIG. 1O use high pressure liquid propane to directly recover the waste heat in the NGL fractionation plant de-ethanizer overhead stream refrigeration compressors. To do so, the high pressure liquid propane is flowed through a seventeenth heat exchanger 6q having a thermal duty between 400 MM Btu/h and 410 MM Btu/h (for example, about 403 MM Btu/h). The high pressure liquid propane at a pressure of between 15 bar and 25 bar (for example, 20 bar) and a temperature of between 80° F. and 90° F. (for example, 88° F.) is fully vaporized in the seventeenth heat exchanger 6q. The vapor propane is directed to work as a motive stream in a vapor ejector.

In the compressor-ejector cycle, the first liquid propane stream flows from a high pressure feed drum at a pressure of between 20 bar and 30 bar (for example, 24 bar) located after the refrigeration compressor after-cooler to an eighteenth heat exchanger 6r that has a thermal duty of between 90 MM Btu/h and 100 MM Btu/h (for example, 98 MM Btu/h). This sub-cooler uses another stream of liquid propane from the ejector cycle as shown in FIG. 1O. The second liquid propane stream is at a pressure of between five bar and 15 bar (for example, 10.8 bar). A small portion of this second propane liquid stream (for example about 20%) is throttled in a throttling valve to a pressure between five bar and 10 bar (for example, 6.25 bar) to generate chilling capacity at a temperature between 45° F. and 55° F. (for example, about 49° F.) for a thermal load of between 90 MM Btu/h and 100 MM Btu/h (for example, 98 MM Btu/h). The chilling capacity is sufficient to satisfy the needs of the NGL fractionation plant de-ethanizer overhead stream propane refrigeration compressor stream sub-cooling. The remainder of the second propane stream is pumped to a higher pressure of between 15 bar and 25 bar (for example, about 20 bar).

The two propane vapor streams—the first out of the sub-cooler at a temperature of between 50° F. and 60° F. (for example, 55° F.) and a pressure between 3 bar and 10 bar (for example, 5.9 bar), and the second out of the seventeenth heat exchanger at a temperature between 125° F. and 135° F. (for example, 131° F. and a pressure between 15 bar and 25 bar (for example, 19.3 bar)—are mixed in a customized ejector to get a vapor stream at the desired pressure for condensation using cooling water at a temperature between 70° F. and 80° F. (for example, 77° F.). The propane stream out of the ejector at a pressure between five bar and 15 bar (for example, 11 far) and a temperature between 95° F. and 105° F. (for example, 99° F.) is condensed and flowed to the ejector cycle for the compressor stream sub-cooling using the compressors low grade waste heat directly.

Figure 1P:
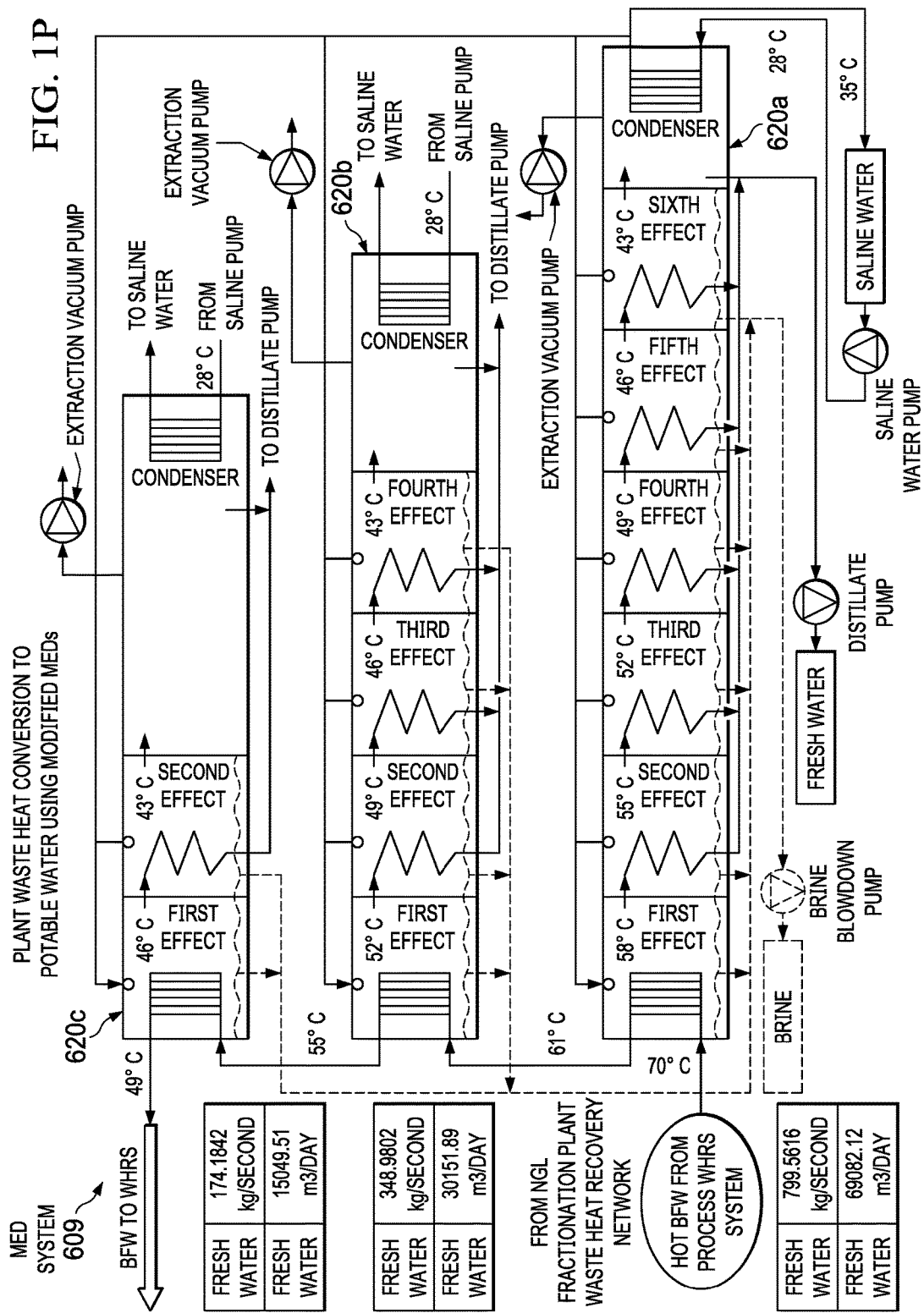
FIG. 1P is a schematic diagram representing an example of a modified MED system configured to produce potable water using pressurized water heated by a heat exchanger network.

FIG. 1P is a schematic diagram representing an example of a modified MED system 609 configured to produce potable water using the pressurized water heated by the heat exchanger network 607. The modified MED system represented by FIG. 1P can be implemented to produce about 114,000 m³/day of potable water. The system includes multiple trains, for example, three trains, in series. The trains can be independent from each other. Each train, in turn, can include multiple effects having the same design. An effect includes a heat exchanger that uses the water heated by the heat exchanger network 607 to distill the brackish water into fresh, potable water and brine. The effects can be coupled in parallel. In some implementations, the hot waste stream heated by the heat exchanger network 607 starts at between 65° C. and 75° see (for example, about 70° C.) when flowed into the MED system and ends at between 45° C. 55° C. (for example, 49° C.) when flowed out of the MED system. The temperature of brine from which the potable water is generated is between 55° C. and 65° C. (for example, about 58° C.).

In the schematic diagram shown in FIG. 1P, the MED system 609 includes three trains. The first train 620a can include six effects connected in series. The second train 620b can include four effects connected in series. The third train 620C can include two effects connected in series. The number of trains and the number of effects in this implementation are examples. The MED system 609 can have fewer or more trains, with each phase having fewer or more effects. The arrangement shown in FIG. 1P represents a best match between the heat duty load and reasonable temperature drop between effects that renders best water production from the available waste heat.

The MED system feed water is distributed onto the heat exchanger of the first effect in all of the trains of the system 609. The high pressure water stream, heated by the heat exchanger network 607, flows through the heat exchanger and releases its energy to the distributed feed water to evaporate a portion of the feed water. The produced vapor then condenses in the heat exchanger of the second effect to evaporate more water in that effect. The brine from the first effect is then purged. At the second effect, the evaporated feed water goes on to power the third effect with the resulting brine being drained from the bottom of the effect. This process continues to the last effect within each train with the corresponding produced vapor entering the condenser section to be condensed by the incoming saline water acting as a coolant. Part of the pre-heated saline water is then sent to the various effects as feed water. The saline water temperature can be between 25° C. and 35° C. (for example, about 28° C.), and the feed water temperature can be between 30° C. and 40° C. (for example, about 35° C.). The temperature drop from one effect to the next can be between 1° C. and 5° C. (for example, 3° C.).

In some implementations, a steam booster unit is included in the MED system to better exploit the waste heat stream to increase the fresh water yield. The steam booster unit includes an evaporator powered by the outgoing waste heat source of the MED system. The vapor generated from the steam booster unit is introduced into a suitable effect of the MED system. The inclusion of the steam booster unit in the MED system can increase the production rate to the extent allowed by the temperature drop across the steam booster unit.

In some implementations, one or more flashing chambers can be included in the MED system to improve the efficiency of the MED system, to extract more energy from the waste heat, and to utilize the extracted energy to generate stream, thereby increasing fresh water production. In such implementations, the outlet source from the MED system goes on to heat the feed water via a liquid-liquid heat exchanger, which is slightly heated by the outlet brine stream from the last flashing chamber. The heated feed water goes through a series of flashing chambers. The vapor generated from each stage of the flashing is then injected into an effect of the MED system for further boosting.

By identifying a best match between the waste heat load temperature profile and the number of effects used in each train, the quantity of water that can be generated using the MED system is optimized.

Thus, particular implementations of the subject matter have been described. Other implementations are within the scope of the following claims.

The invention claimed is:

1. A system comprising:
a waste heat recovery heat exchanger network comprising heat exchangers thermally coupled to a Natural Gas Liquid (NGL) fractionation plant, the heat exchanger network configured to recover at least a portion of heat generated at the NGL fractionation plant, wherein the NGL plant comprises a propane de-hydration section comprising a propane dehydrator column, a de-propanizer section comprising a de-propanizer distillation column, a butane de-hydrator section comprising a butane dehydrator column, and de-butanizer section comprising a de-butanizer distillation column, and wherein the heat exchangers comprise:
a first heat exchanger thermally coupled to the propane dehydration section, the first heat exchanger configured to heat a first buffer stream using heat carried by a propane de-hydration outlet stream from the propane de-hydration section;
a second heat exchanger thermally coupled to the de-propanizer section, the second heat exchanger configured to heat a second buffer stream using heat carried by a de-propanizer overhead outlet stream from the de-propanizer section; and a multi-effect-distillation (MED) system thermally coupled to the waste heat recovery heat exchanger to receive at least a first portion of heat recovered by the heat exchanger network, the MED system configured to produce potable water using at least the first portion of heat recovered by the heat exchanger network, wherein the MED system comprises train distillation effects.

2. The system of claim 1, further comprising a compression-ejector cycle thermally coupled to the waste heat recovery heat exchanger to receive at least a second portion of heat recovered by the heat exchanger network, the compression-ejector cycle comprising a compressor and an ejector, the compression-ejector cycle configured to generate cooling capacity.

3. The system of claim 2, further comprising a flow control system comprising one or more flow pumps, one or more flow pipes, and one or more valves, wherein the flow control system is connected to the heat exchanger network and the MED system or to the heat exchanger network and the compression-ejector cycle or to the heat exchanger network, the MED system and the compression-ejector cycle, the flow control system configured to flow fluids between the NGL fractionation plant, the heat exchanger network, and one or both of the MED system or the compression-ejector cycle.

4. The system of claim 3, wherein the fluids comprise one or more of a NGL fractionation plant stream or a buffer fluid.

5. The system of claim 2, wherein the compression-ejector cycle is configured to generate the cooling capacity to cool at least a portion of the NGL fractionation plant, and wherein the compressor comprises a propane compressor.

6. The system of claim 2, wherein the compression-ejector cycle comprises a mono-refrigerant dual vapor compressor-ejector cycle.

7. The system of claim 2, wherein the compressor-ejector cycle comprises a propane stream that is vaporized to generate the cooling capacity.

8. The system of claim 7, wherein the heat exchangers comprises a seventeenth heat exchanger thermally coupled to a de-ethanizer section of the NGL fractionation plant, the de-ethanizer section comprising a de-ethanizer distillation column, the seventeenth heat exchanger configured to heat the propane stream using heat carried by a de-ethanizer refrigeration compressor outlet stream from the de-ethanizer section.

9. The system of claim 1, wherein the NGL fractionation plant comprises:
a de-pentanizer section comprising a de-pentanizer distillation column, an Amine-Di-Iso-Propanol (ADIP) regeneration section comprising an ADIP regenerator distillation column, a natural gas de-colorizing section comprising a natural-gas de-colorizer distillation column, a propane vapor recovery section comprising a propane vapor recovery compressor and a propane condenser heat-exchanger, and a propane product refrigeration section comprising a propane refrigeration compressor.

10. The system of claim 9, wherein the heat exchangers comprise:
a sixth heat exchanger thermally coupled to the de-pentanizer section, the sixth heat exchanger configured to heat a sixth buffer stream using heat carried by a de-pentanizer overhead outlet stream from the de-pentanizer section; and
a seventh heat exchanger thermally coupled to the ADIP regeneration section, the seventh heat exchanger configured to heat a seventh buffer stream using heat carried by an ADIP regeneration section overhead outlet stream.

11. The system of claim 9, wherein the heat exchangers comprise:
an eighth heat exchanger thermally coupled to the ADIP regeneration section, the eighth heat exchanger configured to heat an eighth buffer stream using heat carried by an ADIP regeneration section bottoms outlet stream; and
a ninth heat exchanger thermally coupled to the natural gas de-colorizing section, the ninth heat exchanger configured to heat a ninth buffer stream using heat carried by a natural gas de-colorizing section pre-flash drum overhead outlet stream.

12. The system of claim 9, wherein the heat exchangers comprise:
a tenth heat exchanger thermally coupled to the natural gas de-colorizing section, the tenth heat exchanger configured to heat a tenth buffer stream using heat carried by a natural gas de-colorizer overhead outlet stream;
an eleventh heat exchanger thermally coupled to the propane vapor recovery section, the eleventh heat exchanger configured to heat an eleventh buffer stream using heat carried by a propane vapor recovery compressor outlet stream; and
a twelfth heat exchanger thermally coupled to the propane product refrigeration section, the twelfth heat exchanger configured to heat a twelfth buffer stream using heat carried by a propane refrigeration compressor outlet stream from the propane product refrigeration section.

13. The system of claim 1, wherein the NGL fractionation plant comprises a propane product sub-cooling section comprising a compressor and a propane condenser heat-exchanger, a butane product refrigeration section comprising a butane refrigeration compressor, an ethane production section comprising an ethane dryer vessel, and a Reid Vapor Pressure (RVP) control section comprising a RVP distillation column.

14. The system of claim 13, wherein the heat exchangers comprise:
a thirteenth heat exchanger thermally coupled to the propane product sub-cooling section, the thirteenth heat exchanger configured to heat a thirteenth buffer stream using heat carried by a propane main compressor outlet stream from the propane product sub-cooling section; and
a fourteenth heat exchanger thermally coupled to the butane product refrigeration section, the fourteenth heat exchanger configured to heat a fourteenth buffer stream using heat carried by a butane refrigeration compressor outlet stream from the butane product refrigeration section.

15. The system of claim 13, wherein the heat exchangers comprise:
a fifteenth heat exchanger thermally coupled to the ethane production section, the fifteenth heat exchanger configured to heat a fifteenth buffer stream using heat carried by an ethane dryer outlet stream; and
a sixteenth heat exchanger thermally coupled to the RVP control section, the sixteenth heat exchanger configured to heat a sixteenth buffer stream using heat carried by a RVP control column overhead outlet stream.

16. The system of claim 1, wherein the heat exchangers comprise:
a third heat exchanger thermally coupled to the butane de-hydrator section, the third heat exchanger configured to heat a third buffer stream using heat carried by a butane de-hydrator outlet stream;
a fourth heat exchanger thermally coupled to the de-butanizer section, the fourth heat exchanger configured to heat a fourth buffer stream using heat carried by a de-butanizer overhead outlet stream from the de-butanizer section; and
a fifth heat exchanger thermally coupled to the de-butanizer section, the fifth heat exchanger configured to heat a fifth buffer stream using heat carried by a de-butanizer bottoms outlet stream from the de-butanizer section.

17. The system of claim 1, further comprising a storage tank configured to store buffer fluid, wherein the flow control system is configured to flow the buffer fluid from the storage tank to the heat exchanger network.

18. The system of claim 17, wherein the buffer fluid comprises pressurized water.

19. The system of claim 1, wherein the MED system comprises a modified MED system.

20. The system of claim 1, wherein the train distillation effects comprise trains, wherein each train is configured to receive a heated buffer fluid from the heat exchanger network and to produce the potable water using the heat carried by the heated buffer fluid.

21. The system of claim 1, wherein the train distillation effects comprise three trains, wherein a first train comprises six effects, a second train comprises four effects and a third train comprises two effects.

22. The system of claim 1, wherein the MED system comprises a first phase comprising three trains, wherein a first effect in a first train of the three trains in the first phase is connected with a first effect of a second train of the three trains in the first phase and with a first effect of a third train of the three trains in the first phase.

23. The system of claim 22, wherein the MED system comprises a second phase comprising three trains, wherein a first effect in a first train of the three trains in the second phase is connected with a first effect of a second train of the three trains in the second phase and with a first effect of a third train of the three trains in the second phase.

24. The system of claim 23, wherein the MED system comprises a third phase comprising three trains, wherein a first effect in a first train of the three trains in the third phase is connected with a first effect of a second train of the three trains in the third phase and with a first effect of a third train of the three trains in the third phase.

* * * * *

UNITED STATES PATENT AND TRADEMARK OFFICE
CERTIFICATE OF CORRECTION

PATENT NO. : 10,443,453 B2
APPLICATION NO. : 15/842160
DATED : October 15, 2019
INVENTOR(S) : Mahmoud Bahy Mahmoud Noureldin and Akram Hamed Mohamed Kamel It is certified that error appears in the above-identified patent and that said Letters Patent is hereby corrected as shown below:

On the Title Page

Item (73) Assignee: please delete "Saudi Araabian Oil Company" and insert -- Saudi Arabian Oil Company -- therefor.

Signed and Sealed this
Nineteenth Day of November, 2019

Andrei Iancu
*Director of the United States Patent and Trademark Office*